(12) United States Patent
Tsang (10) Patent No.: US 7,559,083 B2
(45) Date of Patent: Jul. 7, 2009

(54) METHOD AND APPARATUS FOR GENERATING SECURED ATTENTION SEQUENCE

(75) Inventor: Michael H. Tsang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 709 days.

(21) Appl. No.: 10/341,247

(22) Filed: Jan. 14, 2003

(65) Prior Publication Data

US 2004/0139351 A1 Jul. 15, 2004

(51) Int. Cl.
*H04L 9/32* (2006.01)
(52) U.S. Cl. ....................................................... 726/16
(58) Field of Classification Search .................... 726/16
See application file for complete search history.

(56) References Cited

U.S. PATENT DOCUMENTS 4,672,572 A * 6/1987 Alsberg ....................... 726/11
5,596,718 A * 1/1997 Boebert et al. ................. 726/16
6,212,651 B1 * 4/2001 Schieve et al. ................. 714/36
2003/0236935 A1* 12/2003 Amemiya et al. ........... 710/260

* cited by examiner

*Primary Examiner*—Kambiz Zand
*Assistant Examiner*—Aubrey H Wyszynski
(74) *Attorney, Agent, or Firm*—Birch, Stewart, Kolasch & Birch, LLP (57) ABSTRACT

Aspects of the invention pertain to a processing device having a non-keyboard user interface. In an embodiment of the invention, a user makes a gesture indicating a request for a secured attention sequence, wherein the gesture is made without using a keyboard. The secured attention sequence is generated in response to the gesture. The gesture may include pressing a button on the device or pressing a combination of two buttons on the device. A secure login screen may be displayed as a result of generating the secured attention sequence. In an aspect of the invention, the generating of the secured attention sequence includes simulating the pressing of the Ctrl key, the Alt key and the delete key on a keyboard.

15 Claims, 7 Drawing Sheets

METHOD AND APPARATUS FOR GENERATING SECURED ATTENTION SEQUENCE

FIELD OF THE INVENTION

The invention relates to processing devices with a user interface. More particularly, the invention relates to processing devices with a non-keyboard user interface.

BACKGROUND

Computer security is becoming increasingly important. Electronic data is valuable not only to the individuals who generated it, but to competitors who want to acquire it. Traditionally, electronic data is protected only by a user ID/password pair. Once the user ID and password become known, data accessible by the user may be compromised.

One well-known way for an information thief to obtain the user ID/password pair is by creating a "Trojan Horse" program that simulates a login screen. The Trojan Horse program may present a login screen to the user and obtain the user ID/password pair when this information is entered by the user. One mechanism that was developed to prevent this scenario is the Secured Attention Sequence (SAS), which guarantees to the user that the login screen is genuine. In one implementation of the SAS, the "Ctrl", "Alt" and "Del" keys on the keyboard are pressed simultaneously, while using an operating system, such as a Windows NT® operating system from Microsoft Corporation of Redmond, Wash. The Windows NT® operating systems include Windows NT, Windows 2000 and Windows XP from Microsoft Corporation of Redmond, Wash. Using a secured code path, the SAS action notifies the operating system that the user wishes to authenticate himself or herself to the system.

The secured code path is an exclusive access channel to the keyboard device driver. When the operating system boots, it opens an exclusive communication channel to a keyboard driver. No malicious code can be run in the early stage of an operating system boot. Therefore, the operating system has the first chance to secure this communication channel. Once the channel is secured, no malicious code can tap into this channel for snooping on the communication. Any code trying to open a communication channel with the keyboard later will get "access denied" because it is already opened exclusively by the operating system.

In systems, such as those that are executing a Windows NT® operating system, multiple users can be logged onto the system at the same time. Each user has his/her own session and hence is isolated from other users. Each session has at least two desktops, a default desktop accessible by application programs, including a Trojan Horse program, and a secure desktop having a login dialog, accessible only by the operating system.

Figure 3:
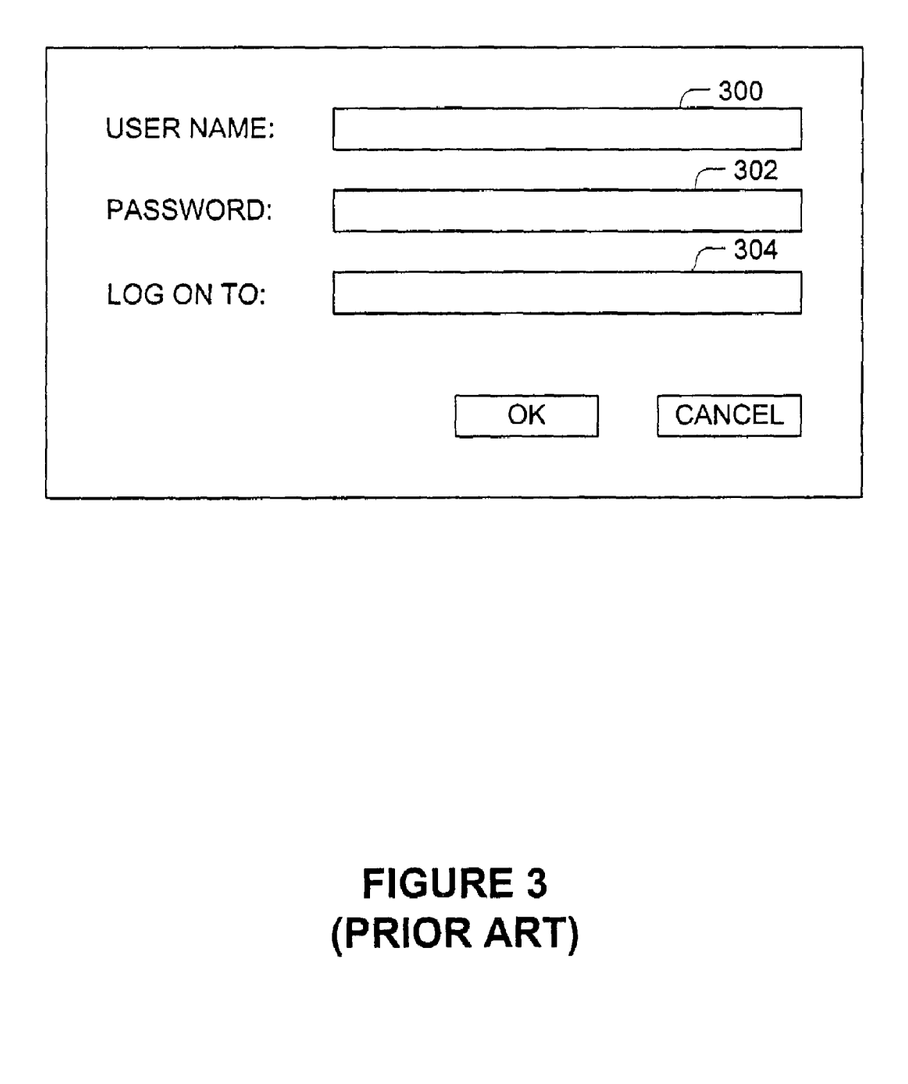
FIG. 3 illustrates a conventional login dialog on a secure desktop screen.

As a result of the SAS action, the system will display the secure desktop having the genuine login dialog, such as shown in FIG. 3. In the login dialog of FIG. 3, the user is requested to enter his/her username 300, password 302 and domain name 304. Thus, if a Trojan Horse program was running and displaying a login dialog on the default desktop, the SAS action will cause a real login dialog on the secure desktop to be displayed, replacing the false login dialog displayed by the Trojan Horse program. Consequently, the user's ID and password cannot be intercepted by the Trojan Horse program.

Some devices, including but not limited to a Tablet PC, may have input devices other than a keyboard. For example, some of the input devices on the Tablet PC are a pen-shaped stylus and a number of buttons on the case. When such a device does not include a keyboard or the keyboard is folded over or otherwise not available, it is not possible to generate a SAS by pressing keys on a keyboard. Therefore, another method of generating the SAS is needed for such devices.

SUMMARY

Aspects of the invention pertain to a processing device having a non-keyboard user interface, thereby addressing at least one problem mentioned above. In an embodiment of the invention, a user makes a gesture indicating a request for a secured attention sequence, wherein the gesture is made without using a keyboard. The secured attention sequence is generated in response to the gesture.

In another aspect of the invention, the gesture includes pressing a button on the device or pressing a combination of two buttons on the device.

In a third aspect of the invention, a secure login screen is displayed as a result of generating the secured attention sequence.

In a fourth aspect of the invention, the generating of the secured attention sequence includes simulating the pressing of the Ctrl key, the Alt key and the Del key on a keyboard.

These and other aspects are described below and in the accompanying figures.

BRIEF DESCRIPTION OF THE DRAWINGS

The foregoing summary of the invention, as well as the following detailed description of the drawings, is better understood when read in conjunction with the accompanying drawings, which are included by way of example, and not by way of limitation with regard to the claimed invention.

DETAILED DESCRIPTION

Exemplary Operating Environment

Figure 1:
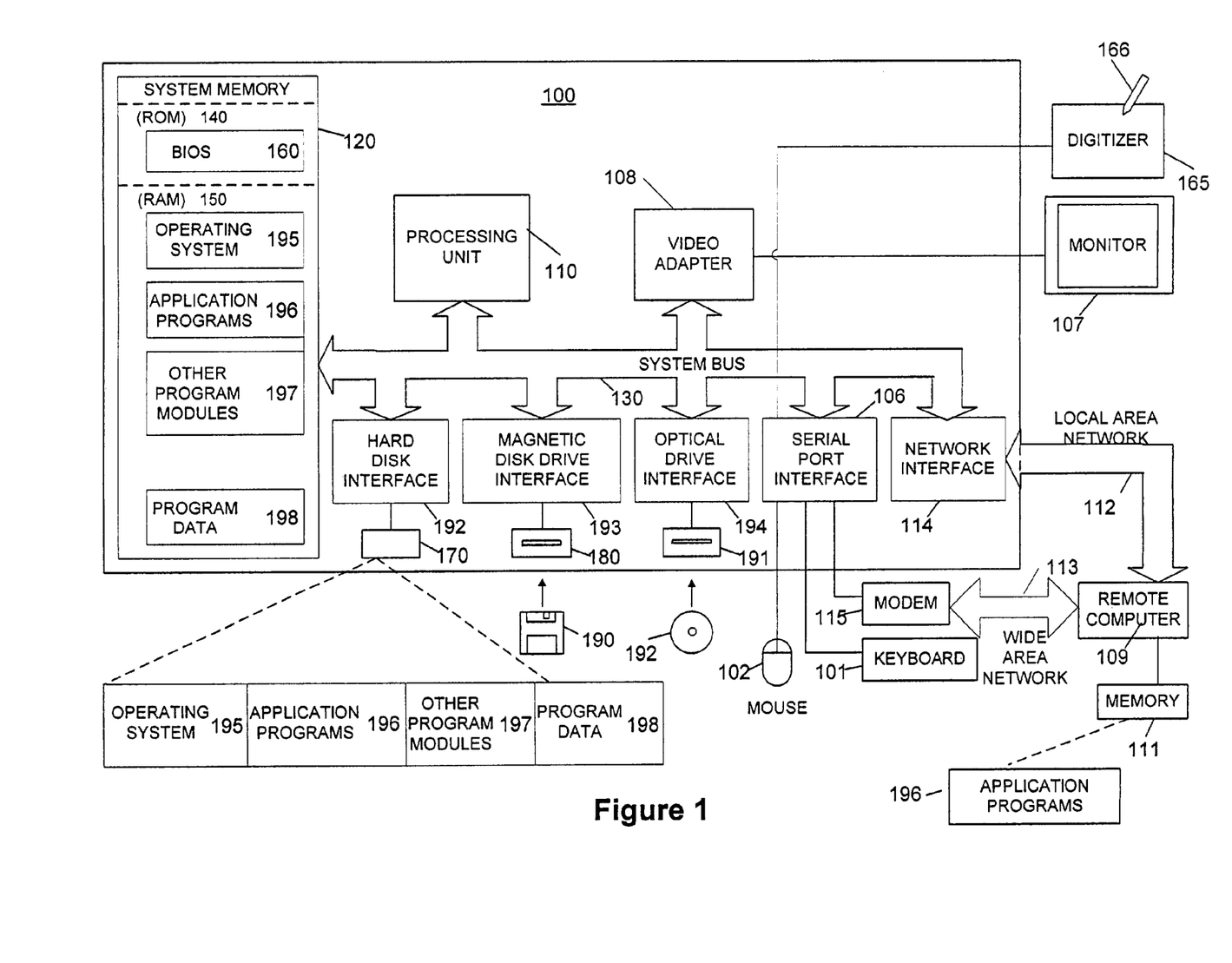
FIG. 1 shows a schematic diagram of a general-purpose digital computing environment that can be used to implement various aspects of the invention.

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 as known in the art. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet. Connections may be established using wired and wireless interfaces including, but not limited to Bluetooth, Wifi, and the like.

When used in a LAN networking environment, the computer 100 is connected to the local network 112 through a network interface or adapter 114. When used in a WAN networking environment, the personal computer 100 typically includes a modem 115 or other means for establishing communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
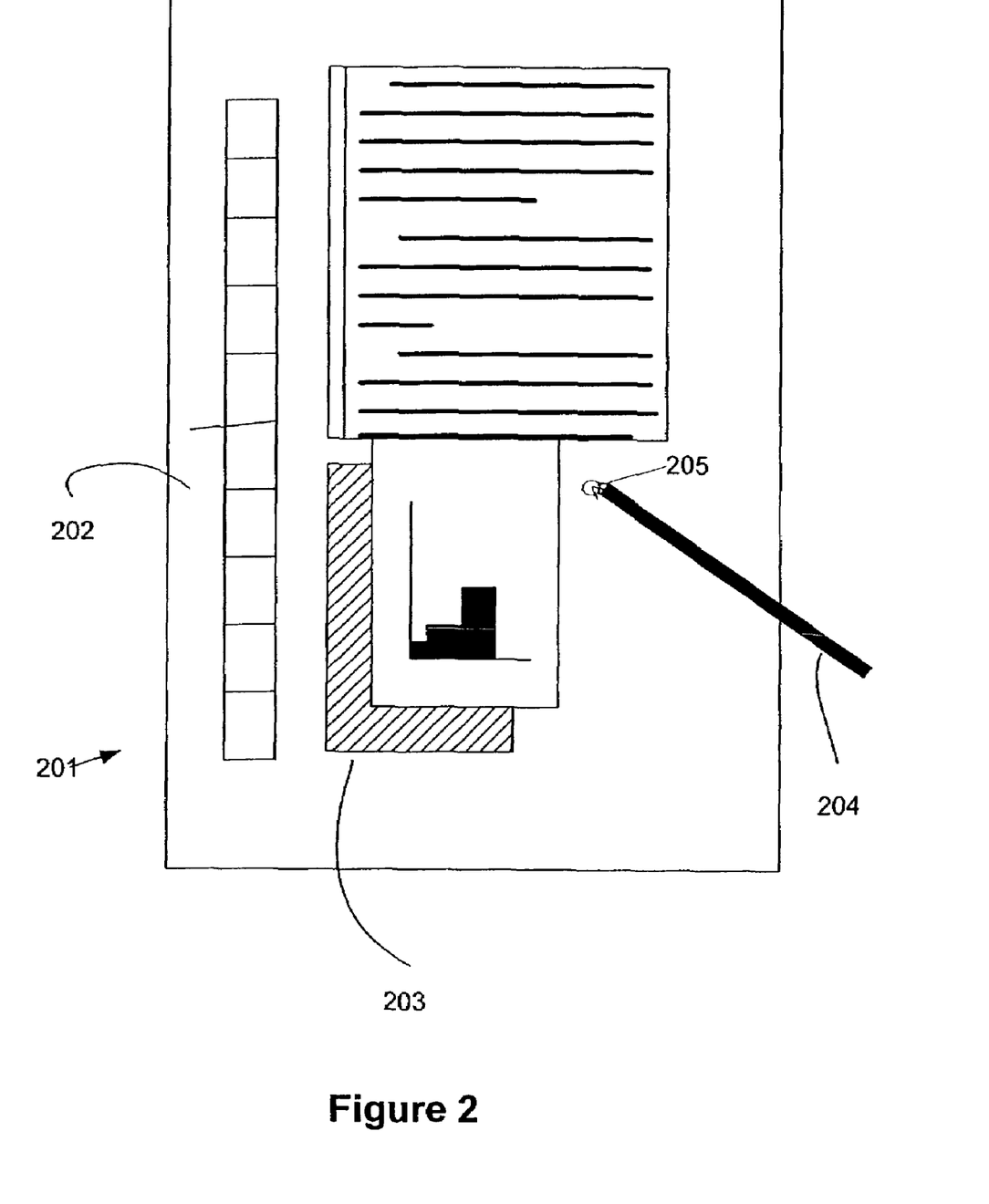
FIG. 2 shows a plan view of a tablet computer and stylus that can be used in accordance with various aspects of the present invention.

FIG. 2 illustrates an exemplary tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 has contacted the display surface 202.

Description of Embodiments

In one implementation, using an operating system such as Microsoft's Windows NT®, the Win32k subsystem establishes secure paths to the secured input devices such as keyboards early during the boot up process by enumerating all input devices and opening exclusive communication channels to the input devices before application programs are started. Win32k opens the channel exclusively so that other programs cannot gain access to the input devices later. Thus, no other applications, such as a Trojan Horse program, can monitor and intercept the input for a SAS action, such as the simultaneous pressing of the "Ctrl", "Alt" and "Del" keys.

Figure 4:
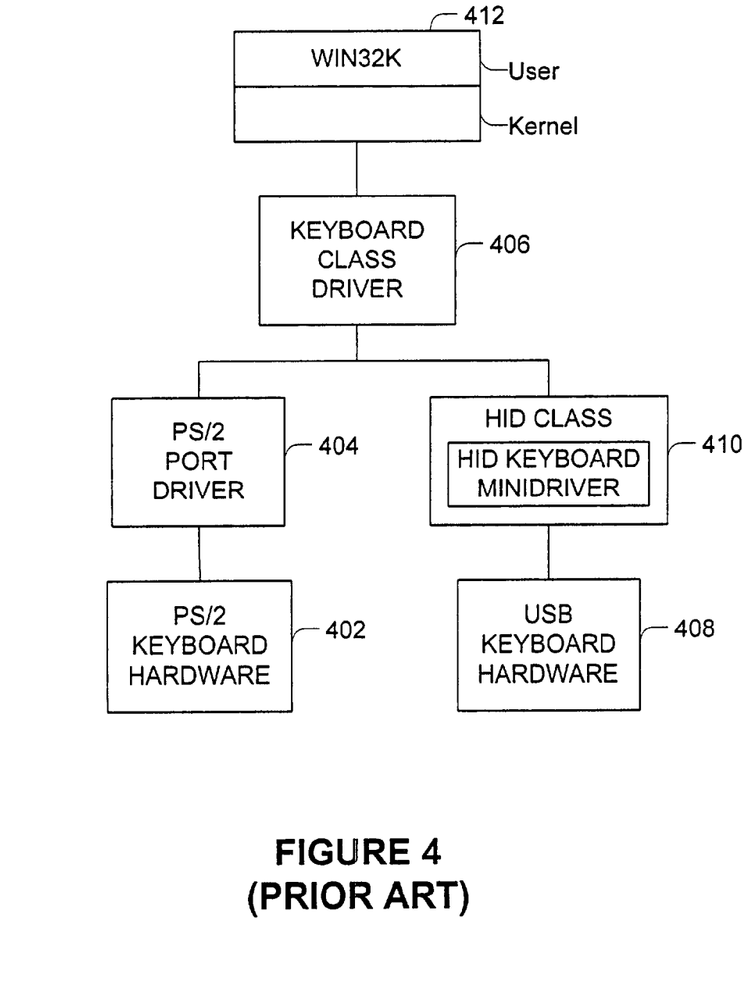
FIG. 4 is a functional block diagram that is helpful in explaining prior art keyboard input processing.

With reference to FIG. 4, keyboard input processing is explained. The input from PS/2 keyboard 402 is received by PS/2 port driver 404. PS/2 port driver 404 passes the input to the keyboard class driver 406 for processing. The keyboard class driver 406 process the input and passes the results to Win32k subsystem 412, which includes a portion that executes in user mode and a portion that executes in kernel mode. Input from USB keyboard 408 is received by HID (Human Interface Device) keyboard minidriver 410, which communicates with the HID class driver. HID keyboard minidriver 410 passes the input to the keyboard class driver 406 for processing. The keyboard class driver 406 processes the input and passes the results to Win32k subsystem 412.

Figure 5:
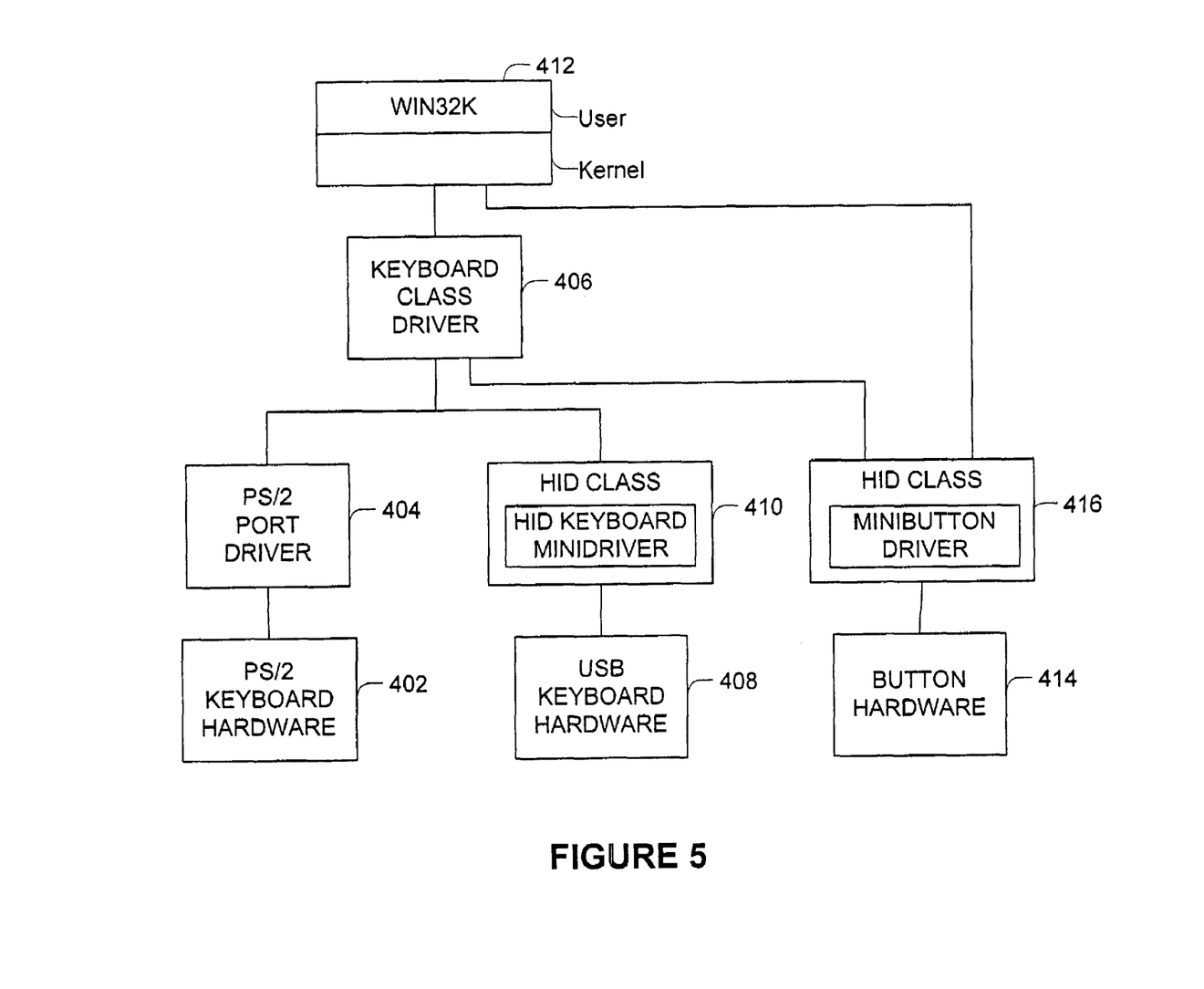
FIG. 5 is a functional block diagram that is useful for explaining input processing in accordance with embodiments of the invention.

FIG. 5 is identical to FIG. 4 with the exception of button hardware 414 and minibutton driver 416. The button hardware 414 refers to one or more buttons that may be included as part of a processing device having a non-keyboard user interface, including but not limited to a Tablet PC. Button hardware 414 reports the button selections or pushes to minibutton driver 416. The minibutton driver 416 determines whether a SAS is requested by a user. The user may request the SAS by making a gesture, which may be, but is not limited to selecting or pressing a button reserved for requesting the SAS or by pressing a combination of two buttons simultaneously. When minibutton driver 416 determines that the SAS is requested, minibutton driver 416 generates events indicating, for example, that "Ctrl", "Alt" and "Del" buttons have been depressed and released and sends the events to the keyboard class driver 406 for processing. Thus, keyboard class driver 406 responds as if, for example, the "Ctrl", "Alt" and "Del" buttons have been depressed from a keyboard device. If minibutton driver 416 determines that the SAS is not requested, then the button input will be sent to Win32k subsystem 412 for processing. In an alternative implementation, when minibutton driver 416 determines that the SAS is not requested, the button input may be sent to a component other than Win32k subsystem 412 for processing. For example, the button input may be sent to a button support component.

Figure 6:
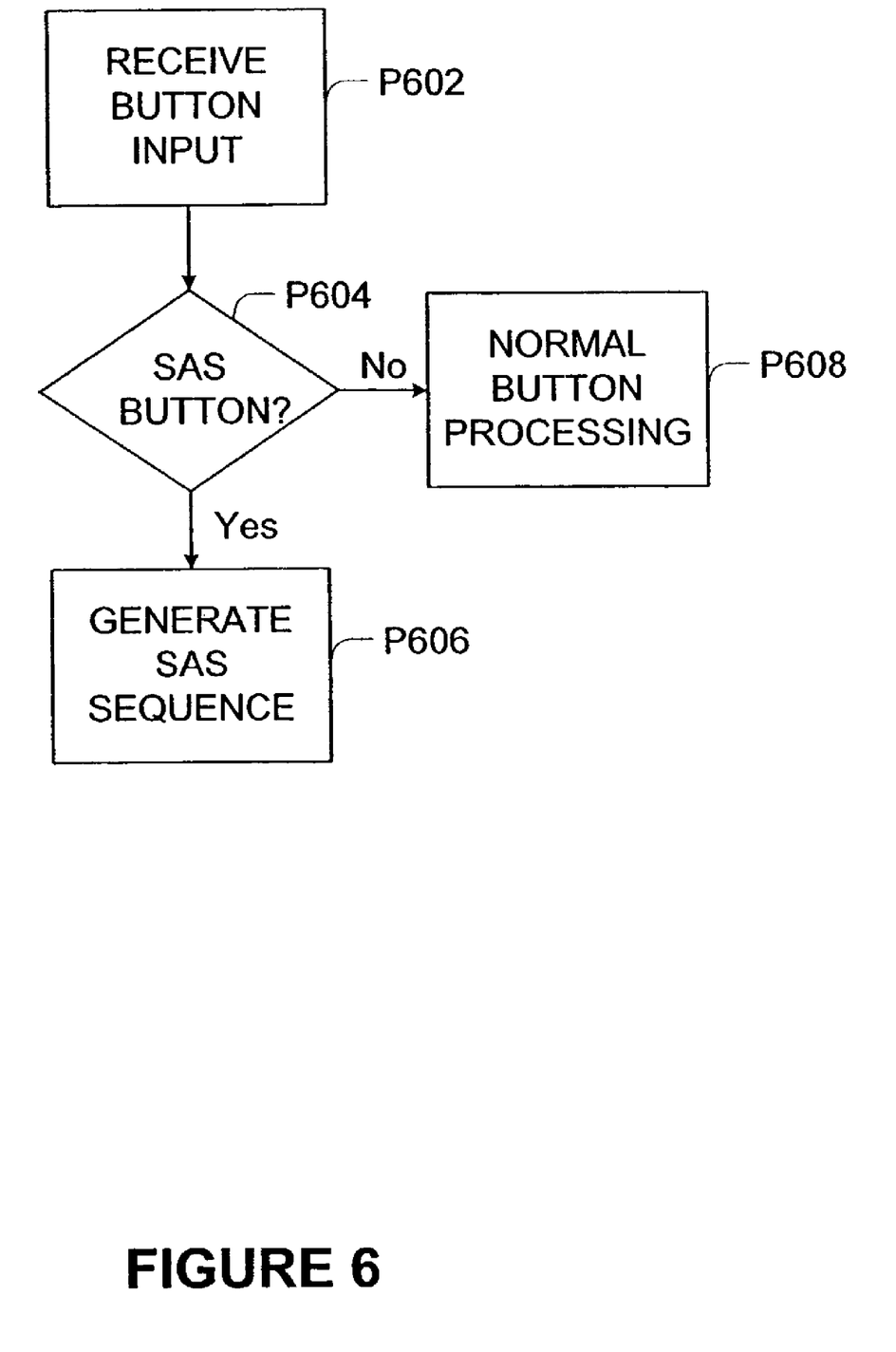
FIG. 6 is a flowchart that explains processing in an illustrative device that may have a non-keyboard user interface in accordance with embodiments of the present invention.

FIG. 6 is a flowchart for illustrating the processing in an illustrative device that may have a non-keyboard user interface. At P602, button input is received as a result of a button being selected or depressed. At P604, minibutton driver 416 determines whether or not a SAS is requested by determining whether a button reserved for the SAS is selected or whether a combination of two buttons simultaneously pressed, indicating a SAS request, is selected. If a SAS is requested, at P606 minibutton driver 416 generates events, such as, for example, events indicating that "Ctrl", "Alt" and "Del" buttons have been depressed and released and sends the events to keyboard class drivers 406 to generate the SAS. As a result of generating the SAS, a secure login screen on the secure desktop, such as shown in FIG. 3 is displayed. If the SAS is determined not to be requested, then at P608, normal button processing occurs via, for example, Win32k subsystem 412.

Figure 7:
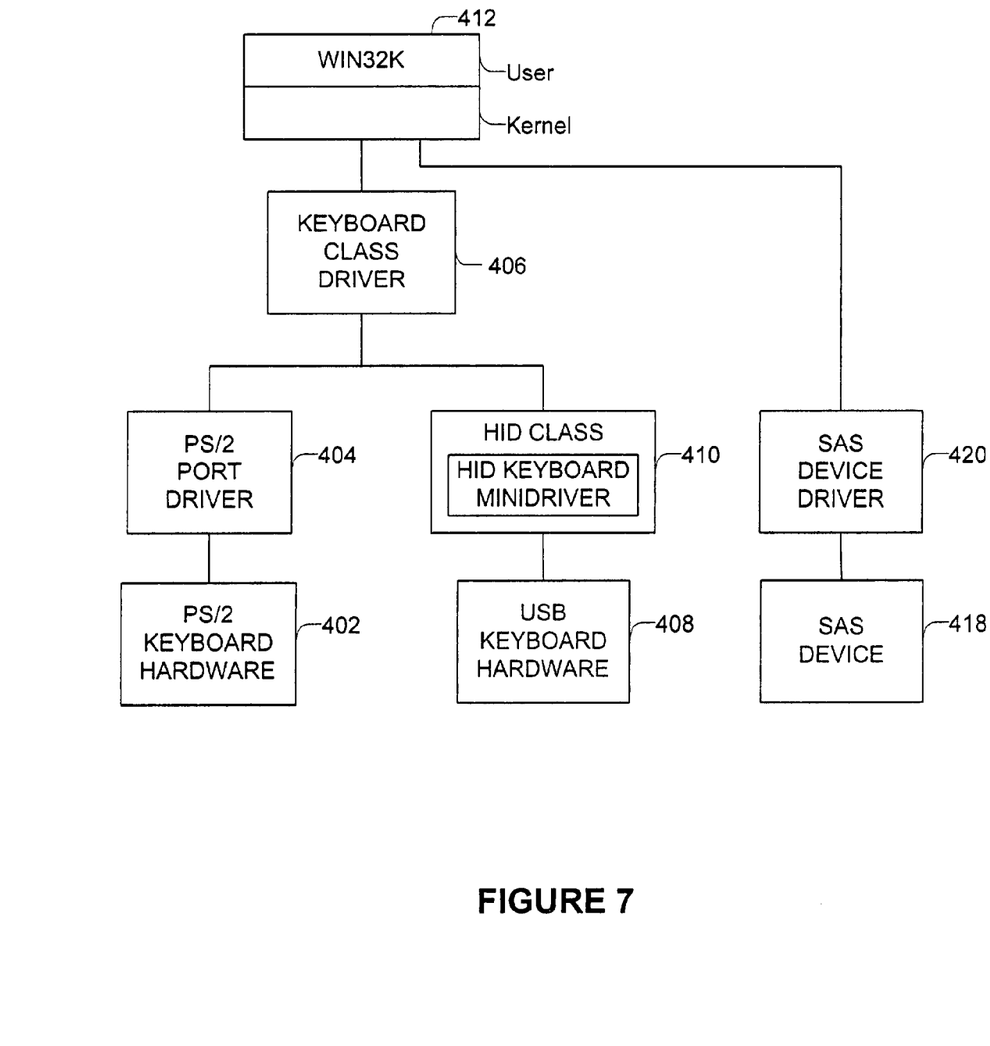
FIG. 7 is a functional block diagram that is useful for explaining input processing in an alternative embodiment of the invention.

FIG. 7 illustrates an alternative embodiment of the invention. FIG. 7 is identical to FIG. 4 with the exception of SAS device 418 and SAS device driver 420. The SAS device 418 is a newly created device which may represent a button dedicated to causing a SAS to be generated. When the button is depressed, SAS device driver 420 receives input indicating that the button was depressed and signals Win32k subsystem 412 to generate the SAS, thus causing the login screen on the secure desktop to be displayed.

The present invention has been described in terms of preferred and exemplary embodiments thereof. Numerous other embodiments, modifications and variations within the scope and spirit of the appended claims will occur to persons of ordinary skill in the art from a review of this disclosure.

I claim as my invention:

1. A method of generating a secured attention sequence on a device having a processor and a user interface, the method comprising:

making a gesture, by a user, to indicate a request for a secured attention sequence, the gesture being made without using a keyboard; and generating, by the device, the secured attention sequence in response to the gesture, wherein in response to a booting of the device, an operating system secures an exclusive communication channel to a keyboard driver, the gesture being made by the user after the exclusive communication channel is established, the gesture is made by the user pressing one or more non-keyboard buttons of the device simultaneously, each of the one or more non-keyboard buttons being configured to report its pressing to a minibutton driver, in response to determining that the one or more non-keyboard buttons have been simultaneously pressed, the minibutton driver indicates to the keyboard driver that the control key, alt key, and delete key of a keyboard have been simultaneously pressed, and the keyboard driver passes the indication that the control key, alt key, and delete key have been pressed to the operating system via the exclusive communication channel, causing the operating system to provide a secure desktop with a login dialog to the user.

2. The method of claim 1, wherein the making of the gesture includes pressing less than three buttons on the device simultaneously.

3. The method of claim 1, wherein the making of the gesture includes pressing one button.

4. The method of claim 3, wherein the generating includes determining that the one button has been pressed and generating the secured attention sequence when the one button has been determined to have been pressed.

5. The method of claim 1, further comprising displaying a secure login screen as a result of generating the secured attention sequence.

6. A machine-readable medium having instructions recorded thereon such that when the instructions are read and executed by a processor within a device, the processor is caused to perform:

recognizing a gesture, by a user, to indicate a request for a secured attention sequence, the gesture being made without using a keyboard; and generating the secured attention sequence in response to the gesture, wherein in response to a booting of the device, an operating system secures an exclusive communication channel to a keyboard driver, the gesture being made by the user after the exclusive communication channel is established, the recognized gesture is the simultaneous pressing one or more non-keyboard buttons of the device, each of the one or more non-key board buttons being configured to report its pressing to a minibutton driver, and the generating step includes:

causing the minibutton driver to respond to reportings that the one or more non-keyboard buttons have been simultaneously pressed by indicating to the keyboard driver that the control key, alt key, and delete key of a keyboard have been simultaneously pressed;

passing the indication that the control key, alt key, and delete key have been pressed from the keyboard driver to the operating system via the exclusive communication channel; and causing the operating system to provide a secure desktop with a login dialog to the user in response to receiving the indication from the keyboard driver.

7. The medium of claim 6, wherein the gesture includes pressing less than three buttons on the device simultaneously.

8. The medium of claim 6, wherein the gesture includes pressing one button.

9. The medium of claim 8, wherein the generating includes determining that the one button has been pressed and generating the secured attention sequence when the one button has been determined to have been pressed.

10. The medium of claim 6, wherein the processor is further caused to perform displaying a secure login screen as a result of generating the secured attention sequence.

11. An apparatus having a processor, which executes an operating system, the apparatus comprising:

a non-keyboard input device for inputting a user request for a secured attention sequence; and a secured attention sequence generator for generating the secured attention sequence in response to the gesture being input by the non-keyboard input device, wherein in response to a booting of the apparatus, the operating system secures an exclusive communication channel to a keyboard driver, the request for the secured attention sequence being input by the user after the exclusive communication channel is established, the request for the secured attention sequence is input by Dressing one or more buttons of the non-keyboard input device simultaneously, the non-keyboard input device being configured to report the pressing of each to a minibutton driver, in response to determining that the one or more non-keyboard buttons have been simultaneously pressed, the minibutton driver indicates to the keyboard driver that the control key, alt key, and delete key of a keyboard have been simultaneously pressed, and the keyboard driver passes the indication that the control key, alt key, and delete key have been pressed to the operating system via the exclusive communication channel, causing the operating system to provide a secure desktop with a login dialog to the user.

12. The apparatus of claim 11, wherein the user request is input by a gesture of pressing at least one button of the non-keyboard input device, wherein the gesture does not require the simultaneous pressing of more than two buttons.

13. The apparatus of claim 11, wherein the user request is input by a gesture of pressing one button of the non-keyboard input device.

14. The apparatus of claim 11, wherein the apparatus is configured to display a secure login screen as a result of generating the secured attention sequence by the secured attention sequence generator.

15. A method of generating a secured attention sequence on a device having a processor and a user interface, the method comprising:

making a gesture, by a user, to indicate a request for a secured attention sequence, the gesture being made without pressing the control key, the alt key and the delete key of a keyboard simultaneously; and generating, by the device, the secured attention sequence in response to the gesture, wherein in response to a booting of the device, an operating system secures an exclusive communication channel to a keyboard driver, the gesture being made by the user after the exclusive communication channel is established, the gesture is made by the user simultaneously pressing a combination of non-keyboard buttons of the device simultaneously, each of the non-keyboard buttons being configured to report its pressing to a minibutton driver, in response to determining that one of the non-keyboard buttons has been pressed part from the making of the gesture, the minibutton driver sends an input corresponding to the pressed non-keyboard button to the operating system for processing, in response to determining that the combination of non-keyboard buttons have been simultaneously pressed, the minibutton driver generates events indicating to the keyboard driver that the control key, alt key, and delete key of a keyboard have been simultaneously pressed, and in response to receiving the indication from the minibutton driver that the control key, alt key, and delete key have been pressed, the keyboard driver passes the indication to the operating system via the exclusive communication channel, causing the operating system to provide a secure desktop with a login dialog to the user.

\* \* \* \* \*